(12) United States Patent
Soga et al.

(10) Patent No.: US 6,332,697 B2
(45) Date of Patent: *Dec. 25, 2001

(54) VEHICLE LAMP AND MOUNTING MEMBER

(75) Inventors: Shigeyuki Soga; Kenji Tomita, both of Shizuoka (JP)

(73) Assignee: Koito Manufacturing Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,655

(22) Filed: Apr. 27, 1999

(30) Foreign Application Priority Data

Apr. 30, 1998 (JP) .................................................. 10-120230

(51) Int. Cl.$^7$ ...................................................... B60Q 1/00
(52) U.S. Cl. ........................... 362/368; 362/365; 362/549; 362/487; 362/496
(58) Field of Search .................................... 362/267, 310, 362/459, 487, 507, 549, 546, 362, 364, 365, 368, 370, 578, 515

(56) References Cited

U.S. PATENT DOCUMENTS

| | | | |
|---|---|---|---|
| 4,972,303 | * 11/1990 | Machida et al. | 362/520 |
| 5,031,079 | * 7/1991 | Kathmann | 362/549 |
| 5,154,505 | * 10/1992 | Sasamoto | 362/549 |
| 5,582,475 | * 12/1996 | Yagi | 362/549 |
| 5,605,392 | * 2/1997 | Daumueller et al. | 362/546 |
| 5,660,456 | 8/1997 | Shinkai et al. | 362/80 |
| 5,963,432 | * 10/1999 | Crowley | 361/804 |

OTHER PUBLICATIONS

Avallone, Eugene A.; Baumeister III, Theodore; Mark's Standard Handbook for Mechanical Engineers, 1996, McGraw–Hill, New York, tenth edition, :pp. 12–122, 13–30 and 13–31.*

De Garmo, E. Paul; Temple Black, J.; Kohser, Ronald A.; Materials and Processes in Manufacturing, 1984, Macmilliam Publishing Company, New York, sisth edition, pp. 20, 825–827.*

* cited by examiner

*Primary Examiner*—Sandra O'Shea
*Assistant Examiner*—Ismael Negron
(74) *Attorney, Agent, or Firm*—Sughrue Mion, PLLC

(57) ABSTRACT

A vehicle lamp wherein a mounting member 20A for mounting and fixing a lamp unit 11 onto a vehicle body is projected from the outer surface of a synthetic-resin lamp body 12 forming part of the lamp unit 11. The mounting member 20A is formed of synthetic-resin and incorporated into the lamp body 12 by welding. A material greater in strength than the lamp body 12 is used as the material of the mounting member 20A to secure sufficient strength for the mounting member 20A. The quantity H of projection of the mounting member 20A from the outer surface of the lamp body 12 is made smaller than the quantity of projection of any conventional mounting member, so that the depth of a lamp chamber can be set greater.

20 Claims, 7 Drawing Sheets

VEHICLE LAMP AND MOUNTING MEMBER

BACKGROUND OF THE INVENTION

1. Field of the Invention

This invention relates to a vehicle lamp provided in the corner portion of a vehicle and furnished with a mounting member which is projected from the outer surface of a lamp body so as to mount a lamp unit on a vehicle body.

2. Description of the Related Art

In a lamp of the sort mentioned above, a lamp unit 1 including a lamp body 2 containing a light source and a lens 3 rounds out from the front side A to the side B of a vehicle body 5 as shown in FIG. 18. The lamp unit 1 on the side B of the vehicle body 5 is fixed to the side B thereof in such a way as to prevent the lamp unit 1 from slipping off by fitting a retaining pin 4 as a lamp-unit-mounting member projected from the lamp body 2 into a grommet 6 provided in the vehicle body 5, whereas the lamp unit 1 on the front side A of the vehicle body 5 is mounted on the vehicle body 5 by fixing the lamp unit 1 to the vehicle body 5 with a screw 7.

As retaining-pin structures, there are a first and a second known structure: in the first structure shown in FIGS. 18 and 19, a metal stud pin 4 is forced into a boss 2a formed in a synthetic-resin lamp body 2; and in the second structure shown in FIG. 20, a retaining pin 8 is integrally formed with a synthetic-resin lamp body 2.

In the first conventional retaining-pin structure (see FIG. 11), however, as the boss 2a for receiving the stud pin (retaining pin) 4 is projected from the lamp body 2, the problem is that the quantity H of projection of the retaining pin 4 from the outer surface of the lamp body 2 becomes large.

In the second conventional retaining-pin structure (see FIG. 20), further, as the material of the retaining pin 8 is limited to the same material as the frail material of the lamp body 2, it is needed to secure the strength of the retaining pin 8 by providing a reinforcing rib 9 on the base side of the retaining pin which may be damaged by bending because of stress concentration. Consequently, there also exist problems arising from the space narrowed by the overhanging reinforcing rib 9 and a substantially large quantity H of projection of the retaining pin 8 from the outer surface of the lamp body 2.

When the retaining pin is provided in the curved portion on the side of the vehicle body where it is hardly easy to secure the depth d of the lamp unit 1 as shown in FIG. 18 in particular, the boss 2a and the reinforcing rib 9 cause the depth d to be narrowed further and this also poses a problem of making the external appearance (the round-out side portion) of the lamp unattractive.

Another problem is that a mold structure tends to become complicated because an undercut portion C needs forming in a mold for producing the lamp body, depending on the direction in which the retaining pin is projected.

SUMMARY OF THE INVENTION

Accordingly, it is an object of the present invention to solve the foregoing problems pertaining to the prior by providing a vehicle lamp in which the quantity of projection of a member for mounting and fixing a lamp unit is reducible as much as possible, which member is projected from the outer surface of a synthetic-resin lamp body forming part of the lamp unit. It is further object of the present invention to provide a vehicle lamp so adapted as to simplify the structure of a mold for use in producing a lamp body. It is yet another object of the present invention to provide a vehicle lamp capable of providing a member for mounting and fixing a lamp unit in any position of a lamp body.

In order to accomplish the objects above, one of embodiments of the vehicle lamps of this invention is such that a mounting member for mounting and fixing a lamp unit onto a vehicle body is projected from the outer surface of a synthetic-resin lamp body forming part of the lamp unit, the mounting member being formed of synthetic-resin and incorporated into the lamp body by welding.

The mounting member can simply be incorporated into the outer surface of the lamp body in any position of the outer surface thereof by welding (vibration welding including ultrasonic vibration, and hot plate welding). In contrast to the first prior art according to which a mounting member such as a stud pin or the like is fitted into a boss, the boss can be dispensed with instead. In contrast to the second prior art according to which a mounting member such as a stud pin or the like is integrally formed with a lamp body, the strength of the mounting member can be secured sufficiently by the use of a material greater in strength than that of the lamp body. Even though the materials of the mounting member and the lamp body are the same, the mounting-member welding area in the lamp body is formable into a wide plate shape, whereby the reinforcing rib can be dispensed with because the strength on the base side of the mounting member which may be damaged by bending due to stress concentration is securable. Consequently, the quantity of projection of the mounting member from the outer surface of the lamp body can be made smaller than the quantity thereof in the prior art.

Although the prior art mold structure is complicated because an undercut portion needs forming in a mold for producing the lamp body, depending on the direction in which the mounting member is projected, such an undercut portion is never produced in the mold for molding the lamp body unless the mounting-member welding area is formed into a special shape even though the mounting member is projected in any given direction according to the present invention.

Another embodiment of the vehicle lamps of this invention is such that the mounting-member welding area in the lamp body is formed flat, so that the mounting member can easily be welded to the lamp body.

Further, another embodiment of the vehicle lamps of this invention is such that a recessed-protruded mating portion for positioning the mounting member and decreasing the load applied to the welding area is formed between the mounting-member welding area in the lamp body and the mounting member. When the recessed and protruded portions between the mounting member and the mounting-member welding area are mated together, the mounting member is automatically positioned with respect to the lamp body, so that the mounting member is readily welded to the lamp body.

Moreover, though the weight of the lamp unit acts as the load applied to the welding area in such a condition that the mounting member integrally welded to the lamp body has securely been fitted to the vehicle lamp, the recessed-protruded portion between the mounting member and the mounting-member welding area also functions as what decreases a load such as the weight of the lamp unit transmitted to the welding area.

DESCRIPTION OF THE PREFERRED EMBODIMENTS

The preferred embodiments of the invention will now be described.

Figure 1:
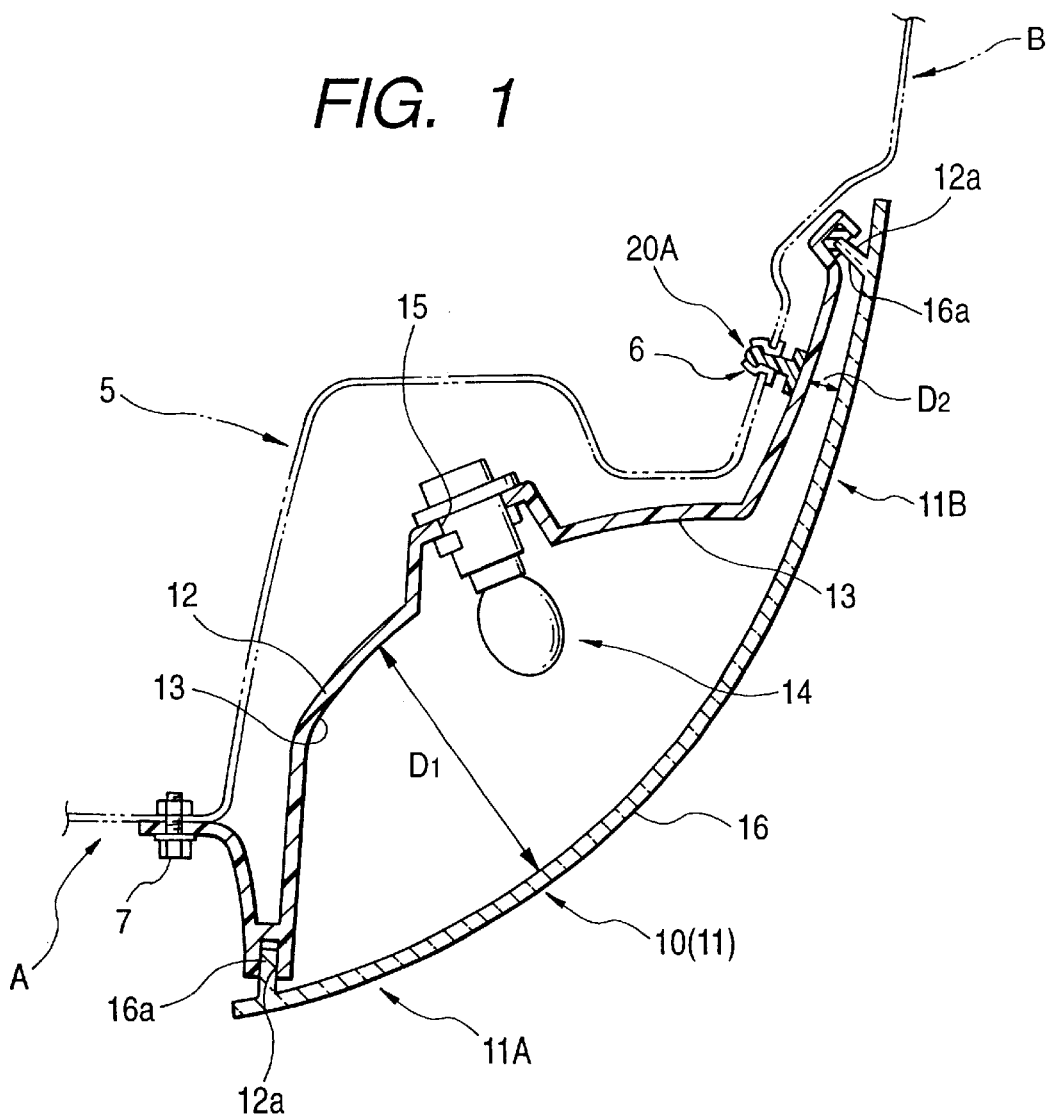
FIG. 1 is a horizontal sectional view of a front turn-signal lamp as a first embodiment of the invention.
Figure 2:
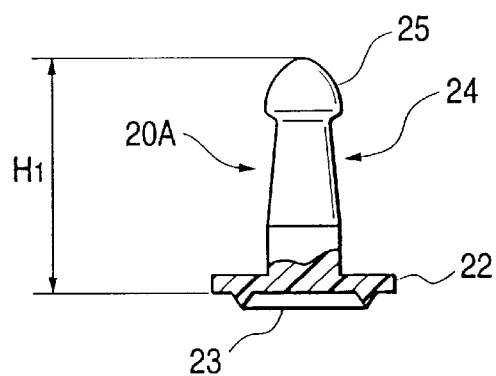
FIG. 2 is a partially cutaway side view of a retaining pin.
Figure 3:
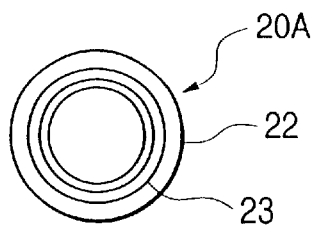
FIG. 3 is a bottom view of the retaining pin.
Figure 4:
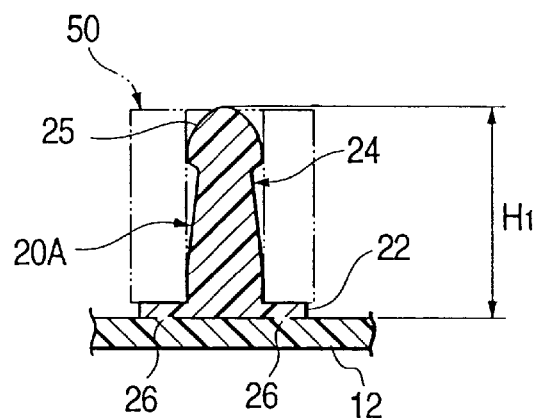
FIG. 4 is a sectional view of a retaining-pin welding area.

FIGS. 1–4 show a front turn-signal lamp on the left side (as seen from a driver's seat) as a first embodiment of the invention, wherein FIG. 1 is a horizontal sectional view of a front turn-signal lamp on the left side; FIG. 2, a partially cutaway side view of a retaining pin for fixedly supporting the outer side of the lamp in the width direction of a vehicle; FIG. 3, a bottom view of the retaining pin; and FIG. 4, a sectional view of a retaining-pin welding area.

Reference numeral 10 denotes a front turn-signal lamp mounted in the corner portion of the vehicle. A bulb 14 as a light source is fitted into the bulb fitting hole 15 of a container-like lamp body 12 made of ABS, and a front lens 16 is installed in the front opening portion of the lamp body 12, the lamp body 12 and the front lens 16 being integrally formed into a lamp unit 11. Reference numeral 13 denotes a reflector integrally formed inside the lamp body 12; 12a, a sealing groove formed in the front opening portion of the lamp body 12; and 16a, a sealing leg formed in the peripheral edge portion of the front lens 16.

The lamp unit 1 substantially rounds out from the front side A to the side B of a vehicle body and though the depth D1 of the lamp unit 11 in an area 11A corresponding to the forepart of the vehicle body is sufficiently great, the depth D2 thereof in an area 11B corresponding to the side of the vehicle body is inevitably less than the depth D1 of the lamp unit 11 in the area 11A corresponding to the forepart of the vehicle body in view of the fact that the lamp unit rounds out backward.

In the lamp unit 11 in the area 11B corresponding to the side of the vehicle body, a retaining pin 20A projected from the back of the lamp body 12 is fitted into a grommet 6 provided in the vehicle body 5 and fixed so as to prevent the retaining pin 20A from slipping off. On the other hand, the lamp unit 11 in the area 11A corresponding to the forepart of the vehicle body is mounted on the vehicle body 5 with a screw 7.

The retaining pin 20A is a molded part made of ABS-PC resin alloy greater in strength than the material of the lamp body 12. As shown in FIGS. 2 and 3, a retaining pin body 24 is projected perpendicularly from a disc-like base plate 22, and an expanded-diameter portion 25 like a headgear which is prevented from slipping off by mating with the grommet 6 mounted on the vehicle body 5 is formed in the front end portion of the retaining pin body 24. A sliding contact projection 23 which is triangular in cross section and extended annularly is provided on the base of the base plate 22, whereas a flat welding surface is formed on the side of the lamp body 12 to which the retaining pin 20A is welded.

In order to weld the retaining pin 20A to the lamp body 12, the base plate 22 and the lamp body 12 are held so that the sliding contact projection 23 is first brought into pressure-contact onto the flat welding surface at the back of the lamp body 12, and a hollow cylindrical horn (a ultrasonic vibrator) 50 is pressed against the surface of the base plate 22 to make ultrasonic vibration act on the pressure-contact portion between the sliding contact projection 23 and the lamp body 12 via the horn 50. When (the sliding contact projection 23 of) the base plate 22 is welded to the lamp body 12 by ultrasonic welding, the retaining pin 20A is incorporated into the back of the lamp body 12; in other words, the periphery of the sliding contact projection 23 is welded to the lamp body 12 when the ultrasonic vibration acts between the base plate 22 and the lamp body 12. Reference numeral 26 denotes a weld.

The length H1 of the retaining pin 20A (the quantity of projection of the retaining pin 20A from the lamp body 12) is made smaller than the quantity H of projection of the prior art retaining pin from the lamp body 12. Consequently, the depth D2 of the lamp unit 11 in the area 11B corresponding to the side of the vehicle body is made greater than the depth d in the corresponding place of the prior art lamp to the extent mentioned above, so that the external appearance of the side where the lamp rounds out is improved.

Figure 5:
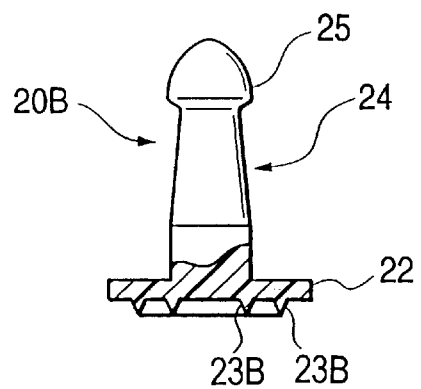
FIG. 5 is a partially cutaway side view of a retaining pin as the principal part in a second embodiment of the invention.
Figure 6:
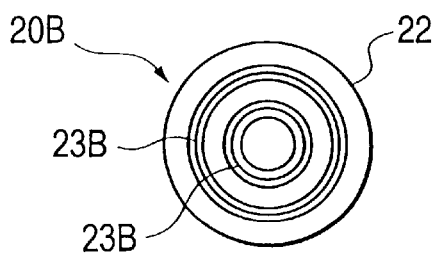
FIG. 6 is a bottom view of the retaining pin.

FIGS. 5 and 6 show a retaining pin as the principal part in a second embodiment of the invention, wherein FIG. 5 is a partially cutaway side view of the retaining pin; and FIG. 6, a bottom view of the retaining pin.

In the case of a retaining pin 20B in the second embodiment of the invention, an annular double sliding contact projection 23B is provided on the base of the base plate 22 and this features that the welding area can be enlarged. The rest of the arrangement is similar to that of the retaining pin 20A in the first embodiment of the invention and by giving like reference characters to like component parts, the description thereof will be omitted.

Figure 7:
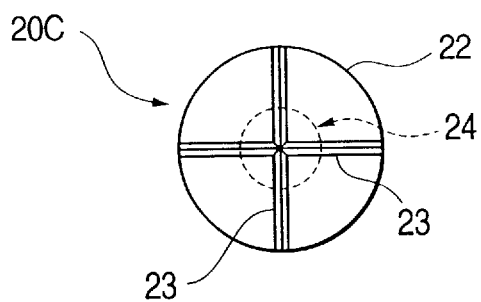
FIG. 7 is a bottom view of a retaining pin as the principal part in a third embodiment of the invention.

FIG. 7 is a bottom view of a retaining pin as the principal part in a third embodiment of the invention.

In the case of a retaining pin 20C in the third embodiment of the invention, a sliding contact projection 23 radially extending like a cross is provided on the base of the base plate 22. The rest of the arrangement is similar to that of the retaining pin 20A in the first embodiment of the invention and by giving like reference characters to like component parts, the description thereof will be omitted.

Figure 8:
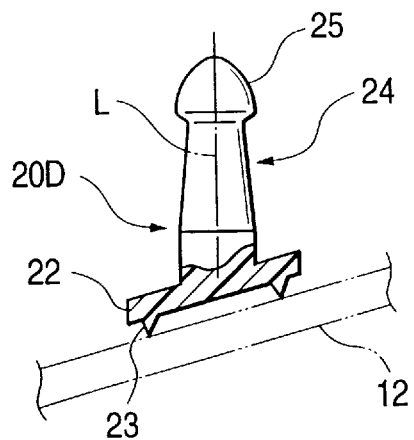
FIG. 8 is a partially cutaway side view of a retaining pin as the principal part in a fourth embodiment of the invention.

FIG. 8 is a partially cutaway side view of a retaining pin as the principal part in a fourth embodiment of the invention.

In the case of a retaining pin 20D in the fourth embodiment of the invention, the retaining pin body 24 is projected obliquely with respect to the base plate 22 (which is formed obliquely with respect to the retaining pin body 24). On the base of the base plate 22, there is provided a sliding contact projection 23 which is annularly extended and triangular in cross section whose apex is directed in the same direction as the direction L in which the retaining pin body 24 is projected.

In this embodiment of the invention, the freedom of the retaining-pin setting position and direction increases because the direction of projecting the retaining pin with respect to the outer surface of the lamp body 12 can freely be set by varying the inclination of the retaining pin body 24 with respect to the base plate 22.

The rest of the arrangement is similar to that of the retaining pin 20A in the first embodiment of the invention and by giving like reference characters to like component parts, the description thereof will be omitted.

Figure 9:
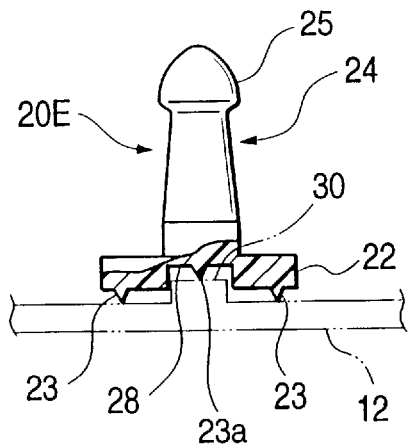
FIG. 9 is a partially cutaway side view of a retaining pin as the principal part in a fifth embodiment of the invention.
Figure 10:
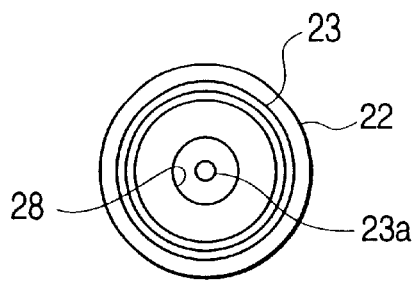
FIG. 10 is a bottom view of the retaining pin.

FIGS. 9 and 10 show a retaining pin as the principal part in a fifth embodiment of the invention, wherein FIG. 9 is a partially cutaway side view of the retaining pin; and FIG. 10, a bottom view of the retaining pin.

In the case of a retaining pin 20E in the fifth embodiment of the invention like the retaining pin 20A in the first embodiment thereof, the sliding contact projection 23 which is triangular in cross section and extended annularly is provided on the base of the base plate 22. Further, a hole 28 as a columnar recessed portion matching a columnar protruded portion 30 provided for the lamp body 12 is provided in the central portion of the base of the base plate 22, and a conical sliding contact projection 23a is provided on the base of this hole 28.

The columnar protruded portion 30 on the lamp body 12 side and the columnar recessed portion 28 on the retaining pin 20E side function as positioning members when the retaining pin 20E is welded to the lamp body 12. In such a condition that the lamp unit incorporating the retaining pin 20E by welding has been mounted on the vehicle body, the mating portion between the columnar protruded portion 30 and the hole 28 functions as what decreases a load such as the weight of the lamp unit applied to the weld between the retaining pin 20E and the lamp body 12.

Figure 11:
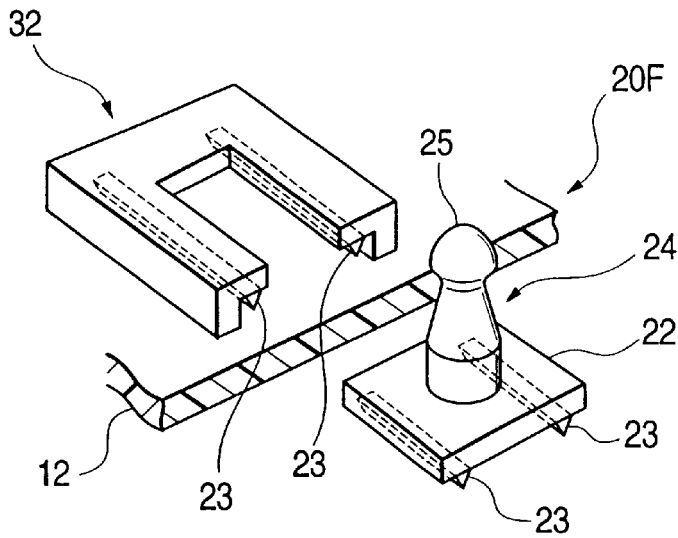
FIG. 11 is an exploded perspective view of a retaining pin and a welding area as the principal parts in a sixth embodiment of the invention.
Figure 12:
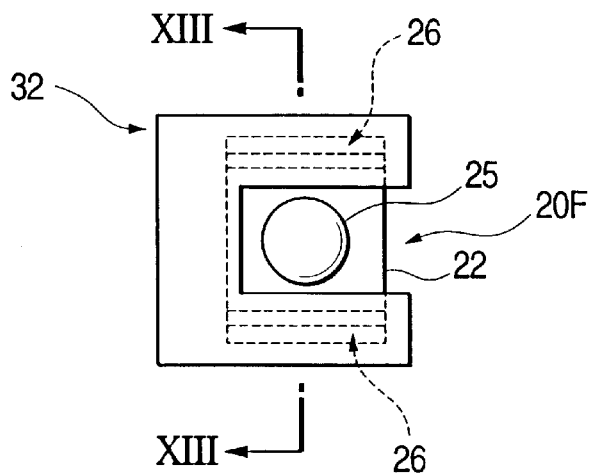
FIG. 12 is a plan view of the retaining pin.
Figure 13:
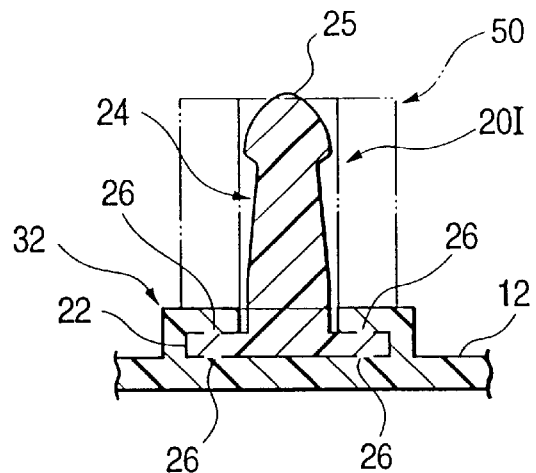
FIG. 13 is a sectional view of the periphery of the retaining pin welded to the welding area.

FIGS. 11–13 show a retaining pin as the principal part in a sixth embodiment of the invention, wherein FIG. 11 is an exploded perspective view of a retaining pin and a welding area as the principal parts in the sixth embodiment of the invention; FIG. 12, a plan view of the retaining pin; and FIG. 13, a sectional view (taken on line XIII—XIII of FIG. 12) of the periphery of the retaining pin welded to the welding area.

The base plate 22 of a retaining pin 2OF is formed into a rectangular shape so that the base plate 22 can mate, by dovetail engagement, with a plate holding frame 32 which is formed on the outer surface of the lamp body 12 and U-shaped in plan view. Further, sliding contact projections 23 and 23 which are triangular in cross section and provided linearly on the base of the base plate 22 and on the sliding surface of the base plate of the lamp body 12 so as to make the sliding contact projections 23 and 23 vertically face each other when the base plate 22 is mated with the plate holding frame 32.

In order to weld the retaining pin 20F to the lamp body 12, the base plate 22 is slidingly inserted (press-fitted) into the plate holding frame 32, whereby the sliding contact projections 23 on the plate holding frame 32 side are brought into pressure-contact onto the surface of base plate 22, whereas the sliding contact projections 23 on the base plate 22 side are also brought into pressure-contact onto the surface of the lamp body 12. In this state, these pressure-contact portions are welded by pressing the hollow cylindrical horn (the ultrasonic vibrator) against the surface of the plate holding frame 32 and letting the ultrasonic vibration act on the pressure-contact portions between the sliding contact projection 23 and the base plate 22 and between the sliding contact projection 23 and the lamp body 12 from above the plate holding frame 32.

The plate holding frame 32 on the lamp body 12 side and the base plate 22 on the retaining pin 20F side function as positioning members by causing the base plate 22 to be inserted (press-fitted) into the plate holding frame 32 when the retaining pin 20F is welded to the lamp body 12. In such a condition that the lamp unit incorporating the retaining pin 20F by welding has been mounted on the vehicle body, the mating portion between the plate holding frame 32 and the base plate 22 functions as what decreases the load such as the weight of the lamp unit applied to the weld 26.

The rest of the arrangement is similar to that of the retaining pin 20A in the first embodiment of the invention and by giving like reference characters to like component parts, the description thereof will be omitted.

Figure 14:
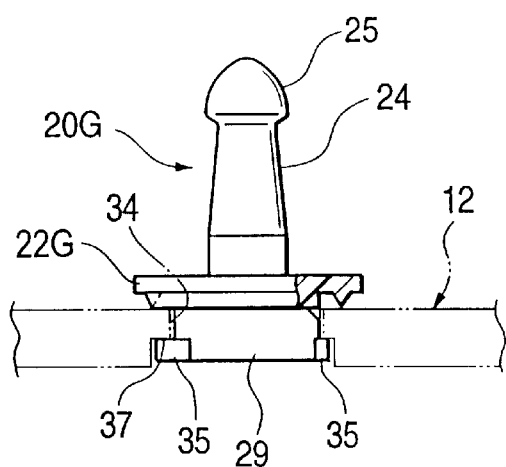
FIG. 14 is a partially cutaway side view of a retaining pin as the principal part in a seventh embodiment of the invention.
Figure 15:
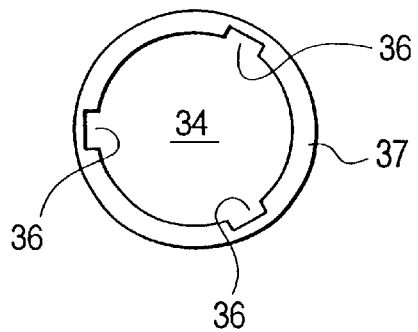
FIG. 15 is a rear elevation of a retaining-pin fitting hole.

FIGS. 14 and 15 show a retaining pin as the principal part in a seventh embodiment of the invention, wherein FIG. 14 is a partially cutaway side view of the retaining pin; and FIG. 15, a bottom view of a retaining-pin fitting hole.

In the seventh embodiment of the invention, a retaining-pin fitting hole 34 is provided in the lamp body 12, and a retaining pin 20G is incorporated into the lamp body 12 when the retaining pin 20G is fitted into the hole 34 by bayonet engagement and before being welded to the lamp body 12 by ultrasonic welding.

The mating portion between the base 29 of the retaining pin 20G and the retaining-pin fitting hole 34 functions as what positions the retaining pin 20G with respect to the lamp body 12 and decreases the load applied to the weld in such a condition that the lamp unit incorporating the retaining pin 20G by welding has been mounted on the vehicle body.

Reference numeral 22G denotes a flange-shaped base plate which is provided on the base side of the retaining pin 20G and brought into contact with the peripheral edge portion of the retaining-pin fitting hole 34, and the sliding contact projection 23 which is triangular in cross section and extended annularly is provided on the underside of the base plate 22. Consequently, the base plate 22 is incorporated into the lamp body 12 by welding as an area along the sliding contact projection 23 is incorporated into the lamp body 12 thereby. Moreover, the retaining-pin fitting hole 34 is surrounded with an annular weld to ensure the waterproofing of the retaining-pin fitting hole 34.

Reference numeral 35 denotes retaining projections for preventing the retaining pin 20G from slipping off by engaging with cut-outs 36 formed in the inner peripheral surface of the retaining-pin fitting hole 34 and mating with an annular groove 37 formed on the peripheral edge portion of the retaining-pin fitting hole 34 when the retaining pin 20G is fitted into the retaining-pin fitting hole 34 by bayonet engagement.

The rest of the arrangement is similar to that of the retaining pin 20A in the first embodiment of the invention and by giving like reference characters to like component parts, the description thereof will be omitted.

Figure 16:
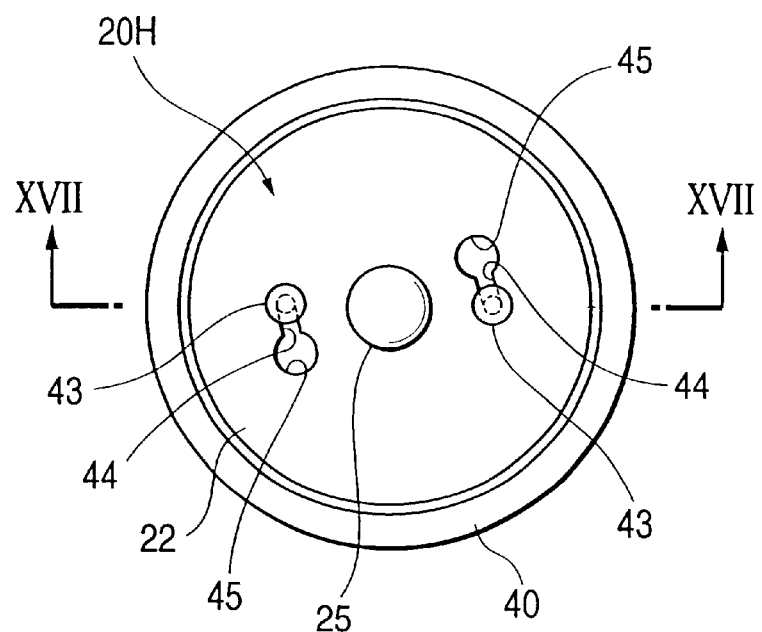
FIG. 16 is a plan view of a retaining pin as the principal part in an eighth embodiment of the invention.
Figure 17:
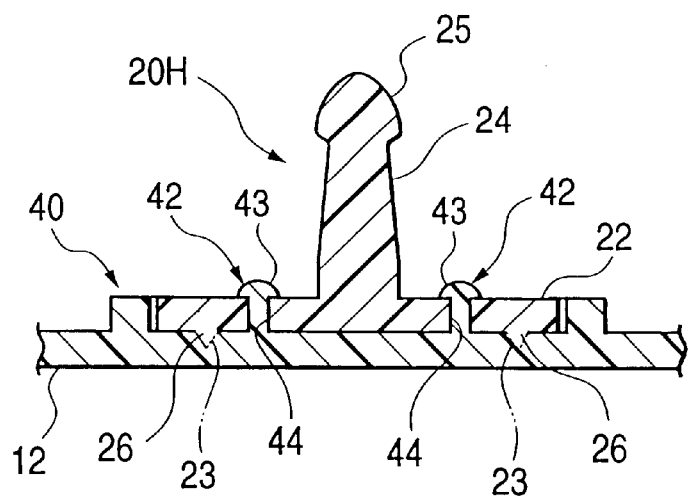
FIG. 17 is a sectional view (taken on line XVII—XVII of FIG. 16) of a retaining-pin fitting hole.
Figure 18:
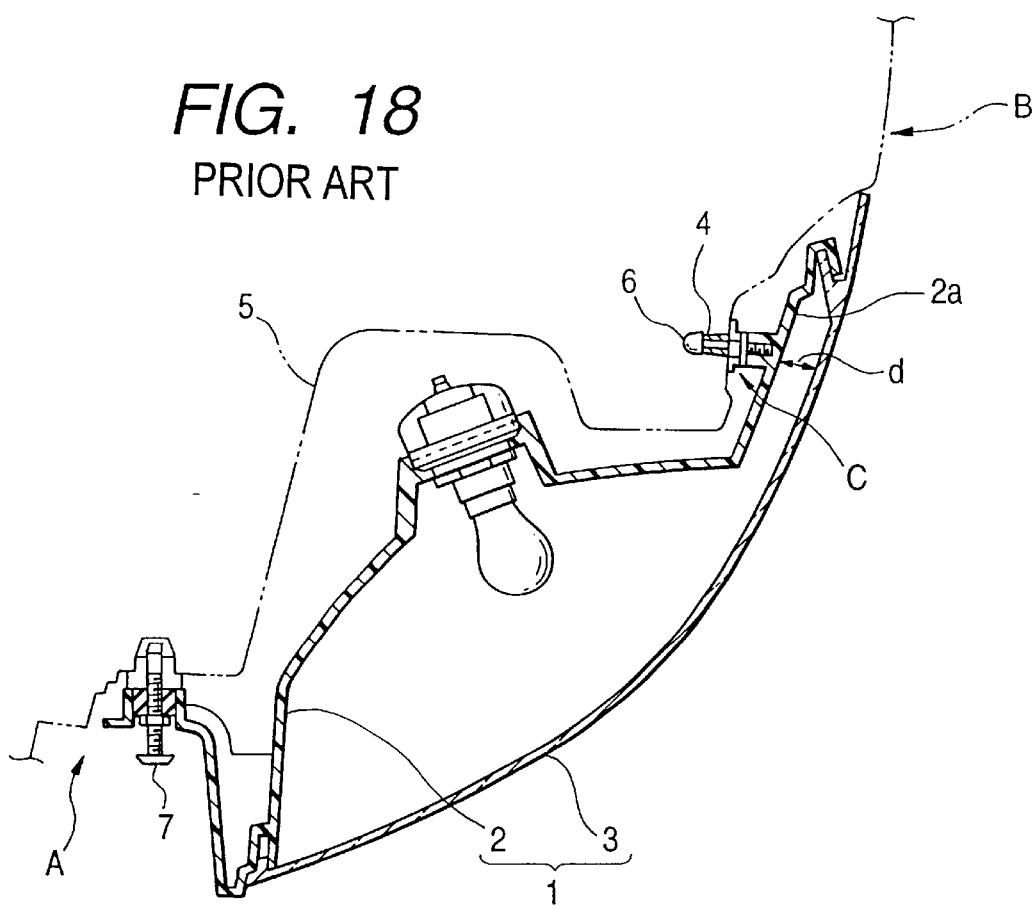
FIG. 18 is a horizontal sectional view of a conventional front turn-signal lamp.
Figure 19:
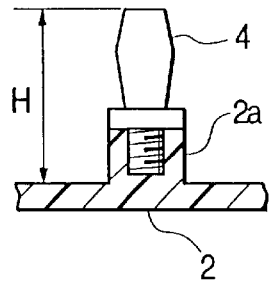
FIG. 19 is a sectional view of a stud-pin projected portion.
Figure 20:
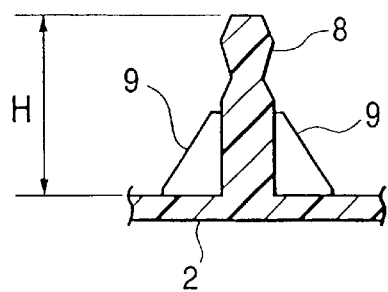
FIG. 20 is a sectional view of the stud-pin projection portion integrally formed with a lamp body.

FIGS. 16 and 17 show a retaining pin as the principal part in an eighth embodiment of the invention, wherein FIG. 16 is a plan view of a retaining pin welded to a welding area; and FIG. 17, a sectional view (taken on line XVII—XVII of FIG. 16) of the retaining pin welded to the welding area.

In the eighth embodiment of the invention, an annular vertical wall 40 is provided for the lamp body 12, and a pair of retaining projections 42 and 42 respectively having expanded portions 43 and 43 are protruded from the vertical wall 40.

On the other hand, the base plate 22 of a retaining pin 20H is disc-shaped so that the base plate 22 is able to mate with the annular vertical wall 40, and the sliding contact projection 23 which is triangular in cross section and extended annularly is provided on the base of the base plate 22. Moreover, the base plate 22 is provided with arcuate slits 44 into which the respective retaining projections 42 are fitted whereby to prevent the retaining projections 42 from slipping off. The retaining pin 20H is set in position with respect to the lamp body 12 by passing the swelled-out portion 43 at the leading end of the retaining projection 42 through a large-diameter circular hole 45 in the end portion of each slit 44 and turning the retaining pin 20H (the base plate 22) counterclockwise until the retaining projection 42 is brought into contact with the end portion of the slit 44.

The rest of the arrangement is similar to that of the retaining pin 20A in the first embodiment of the invention and by giving like reference characters to like component parts, the description thereof will be omitted.

Although the structure built up by incorporating the retaining pin made of ABS.PC resin alloy into the lamp body made of ABS by welding has been described in the preceding embodiment of the invention, the retaining pin may be formed by incorporating a retaining pin made of PET.PC resin alloy into a lamp body made of ABS resin by welding or otherwise incorporating a retaining pin made of ABS.PC resin alloy into a lamp body made of ABS thereby. Furthermore, the material of the lamp body may be the same as that of the retaining pin or different from that of the latter. Moreover, retaining pins made of ABS, PC or AAS resin may be employed for lamp bodies made of ABS or PC resin.

Although the structure built up by incorporating the retaining pin into the lamp body 12 by ultrasonic welding has been described in the preceding embodiment of the invention, it may be built by vibration welding, hot plate welding or any other welding method.

Although the retaining pin has been incorporated into the lamp body in the preceding embodiment of the invention, synthetic resins may be used for forming lamp-unit mounting members such as bolts, nuts, fasteners and so forth.

As set forth above, as the quantity of projection of the mounting member from the outer surface of the lamp body in the vehicle lamp of claim 1 can be made smaller than the quantity thereof in the prior art, the external appearance of the lamp is made improvable by securing greater depth for a lamp chamber having an area where the mounting member of the lamp unit is installed.

Even though the mounting member is arranged so that it may be projected in any given direction, an undercut portion is never produced in the mold for molding the lamp body unless the mounting-member welding area is formed into a special shape, which results in simplifying the mold structure.

Moreover, the freedom of the lamp unit setting position with respect to the vehicle body increases because the retaining pin can be installed in any position of the lamp body.

According to claim 2, the mounting-member welding operation is smoothly performable.

According to claim 3, the load applied to the weld is decreased by the recessed and protruded portions between the mounting member as a positioning means and the welding area, whereby the mounting member is fit for long-term use without being damaged in the weld.

What is claimed is:

1. A vehicle lamp comprising:
   a synthetic-resin lamp body forming part of a lamp unit;
   a mounting member for mounting the lamp unit onto a vehicle body, which is projected from an outer surface of the synthetic-resin lamp body; and,
   the mounting member being formed of synthetic-resin and incorporated into the lamp body by welding.

2. A vehicle lamp as claimed in claim 1, wherein a mounting-member welding area in the lamp body has a flat surface.

3. A vehicle lamp as claimed in claim 1, wherein said mounting member has a columnar recessed portion and said lamp body has a columnar protruded portion for mating with said recessed portion for positioning the mounting member on said lamp body and decreasing a load applied to a welding area between a mounting-member welding area in the lamp body and the mounting member.

4. A vehicle lamp as claimed in claim 1, wherein the mounting member and the lamp body are coupled together by bayonet coupling before the mounting member is incorporated into the lamp body by welding.

5. A vehicle lamp as claimed in any one of claims 1 to 4, wherein the mounting member is incorporated into the lamp body by ultrasonic welding.

6. A vehicle lamp as claimed in claim 5, the mounting member further comprising a retaining pin and a base plate, wherein a sliding contact projection is provided on a base of the base plate.

7. A vehicle lamp comprising:
   a synthetic resin lamp body forming part of a lamp unit;
   a mounting member for mounting the lamp unit onto a vehicle body, said mounting member projecting from an outer surface of the lamp body and comprising a retaining pin, and a base plate, wherein at least one sliding contact projection is provided on a base of the base plate; and
   the mounting member being formed of synthetic-resin and incorporated into the lamp body by welding.

8. The vehicle lamp claimed in claim 7, wherein the mounting member is incorporated into the lamp body by ultrasonic welding.

9. The vehicle lamp claimed in claim 7, wherein the at least one sliding contact projection has a substantially triangular cross-section.

10. The vehicle lamp claimed in claim 7, wherein the at least one sliding contact projection is circular in shape.

11. The vehicle lamp claimed in claim 7, wherein the at least one sliding contact projection comprises a horizontal and a vertical member.

12. The vehicle lamp as claimed in claim 7, wherein the sliding contact projection comprises at least two concentric circles.

13. The vehicle lamp as claimed in claim 7, wherein the sliding portion comprises at least two horizontal members or at least two vertical members.

14. The vehicle lamp as claimed in claim 7, wherein the mounting member projects in an oblique direction from the outer surface of the lamp body, and wherein an apex of the at least one sliding contact projection extends from the base of the base plate on the mounting member in the same direction as the mounting member.

15. A vehicle lamp comprising:

a synthetic resin lamp body forming part of a lamp unit;

a mounting member for mounting the lamp unit onto a vehicle body, said mounting member projecting from an outer surface of the lamp body, and comprising a retaining pin, and a base plate, wherein said base plate has a columnar recessed portion and said lamp body has a columnar protruding portion mating with said columnar recessed portion; and the mounting member being formed of synthetic-resin and incorporated into the lamp body by welding.

16. The vehicle lamp claimed in claim 15, wherein said columnar recessed portion has a sliding contact projection.

17. The vehicle lamp claimed in claim 15, wherein said columnar recessed portion has a first sliding contact portion and said base plate has a second sliding contact projection.

18. The vehicle lamp claimed in claim 16, wherein said sliding contact projection has a substantially triangular cross-section.

19. The vehicle lamp claimed in claim 17, wherein said first and second sliding contact projections have a substantially triangular cross-section.

20. The vehicle lamp claimed in claim 17, wherein said second sliding contact portion on said base plate is circular in shape.

* * * * *